(12) United States Patent
Cropper et al.

(10) Patent No.: US 9,330,392 B2
(45) Date of Patent: May 3, 2016

(54) COLLECTING INTEREST DATA FROM CONVERSATIONS CONDUCTED ON A MOBILE DEVICE TO AUGMENT A USER PROFILE

(75) Inventors: Joseph W. Cropper, Rochester, MN (US); Robert D. Holt, Raleigh, NC (US); Jason A. Nikolai, Rochester, MN (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 2469 days.

(21) Appl. No.: 12/049,477

(22) Filed: Mar. 17, 2008

(65) Prior Publication Data

US 2009/0234796 A1 Sep. 17, 2009

(51) Int. Cl.
*G10L 15/22* (2006.01)
*G06Q 30/02* (2012.01)

(52) U.S. Cl.
CPC ............... *G06Q 30/02* (2013.01); *G10L 15/22* (2013.01)

(58) Field of Classification Search
CPC .................................................... G10L 15/22
USPC ........................................ 704/270, 9, 235, 251
See application file for complete search history.

(56) References Cited

U.S. PATENT DOCUMENTS

| 6,606,644 | B1* | 8/2003 | Ford et al. ...................... 709/203 |
|---|---|---|---|
| 6,654,735 | B1* | 11/2003 | Eichstaedt et al. ............ 707/749 |
| 2006/0085419 | A1* | 4/2006 | Rosen ................................. 707/9 |
| 2007/0038436 | A1* | 2/2007 | Cristo et al. ....................... 704/9 |
| 2007/0116227 | A1* | 5/2007 | Vitenson et al. ......... 379/207.02 |
| 2008/0172359 | A1* | 7/2008 | Lundell et al. .................... 707/3 |

OTHER PUBLICATIONS

Lui, H., et al., "InterestMap: Harvesting Social Network Profiles for Recommendations", Workshop: Beyond Personalization 2005, IUI '05, Jan. 9, 2005.

* cited by examiner

*Primary Examiner* — Daniel Abebe
(74) *Attorney, Agent, or Firm* — Patents on Demand P.A.; Brian K. Buchheit; Scott M. Garrett

(57) ABSTRACT

The present invention discloses a solution for collecting interest data from conversations conducted on a mobile device to augment a user profile. Such a solution can include an interest data coordinator and a user profile. The interest data coordinator can be configured to analyze conversations conducted upon a mobile device for interest data. The user profile can represent a compilation of user data and interest data.

14 Claims, 3 Drawing Sheets

COLLECTING INTEREST DATA FROM CONVERSATIONS CONDUCTED ON A MOBILE DEVICE TO AUGMENT A USER PROFILE

BACKGROUND OF THE INVENTION

The present invention relates to the field of data collection and, more particularly, to collecting interest data from conversations conducted on a mobile device to augment a user profile.

The collection of user data is a common practice among Web-based applications and services. Often, a user is required to fill out a questionnaire, typically called a user profile, when registering for such applications and services. For example, an online social network community requires a new member to list a variety of personal information that allows other members to find people with common interests.

As noted above, user profiles are created and modified manually by a user. While effective, in a simplistic sense, this process is fundamentally flawed by completely relying upon the user to input data. In particular, this process relies upon a user's self-awareness and ability to express their interests. For example, a user who walks home from work through a park everyday may not consider "nature walks" as an interest because the user associates walking in the park with work and not enjoyment.

Further, a user is often unaware of new and/or casual interests, especially when there is a significant amount of time between occurrences or resources required. For example, a fledgling interest in jazz may go unnoted if the user must plan expensive trips to other locations to attend performances. Additionally, a casual interest can go unnoticed when a user participates only with a specific group of people, such as playing pool with coworkers occasionally after work.

When a user identifies a new interest, the addition of this information to the user profile must be made manually by the user. Updating one's user profile is often not a high priority for many users. Thus, user profiles tend to capture a recent, but static listing of a user's interests.

When participating in a new and/or existing interest, a user typically engages in a variety of conversations related to the interest. These conversations, which are often conducted on mobile devices, are an untapped data resource that can assist in the identification of a user's interests. Conventional systems for capturing interest data for a user profile ignore this wealth of data.

BRIEF SUMMARY OF THE INVENTION

One aspect of the present invention can include a system for collecting interest data from conversations conducted on a mobile device to augment a user profile. Such a system can include an interest data coordinator and a user profile. The interest data coordinator can be configured to analyze conversations conducted upon a mobile device for interest data. The user profile can represent a compilation of user data and interest data.

Another aspect of the present invention can include a method for collecting interest data from conversations on a mobile device to augment a user profile. Such a method can begin with the identification of a conversation being conducted on a mobile device. The conversation can then be analyzed for interest data. Collected interest data can be used to automatically augment a user profile.

Yet another aspect of the present invention can include a mobile device that extracts interest data from conversations to augment a user profile. Such a mobile device can include data input components and an interest data coordinator. The data input components can be configured to capture conversations conducted on the mobile device. The interest data coordinator can be configured to extract interest data from the conversations and automatically augment a user profile stored on the mobile device.

DETAILED DESCRIPTION OF THE INVENTION

Figure 1:
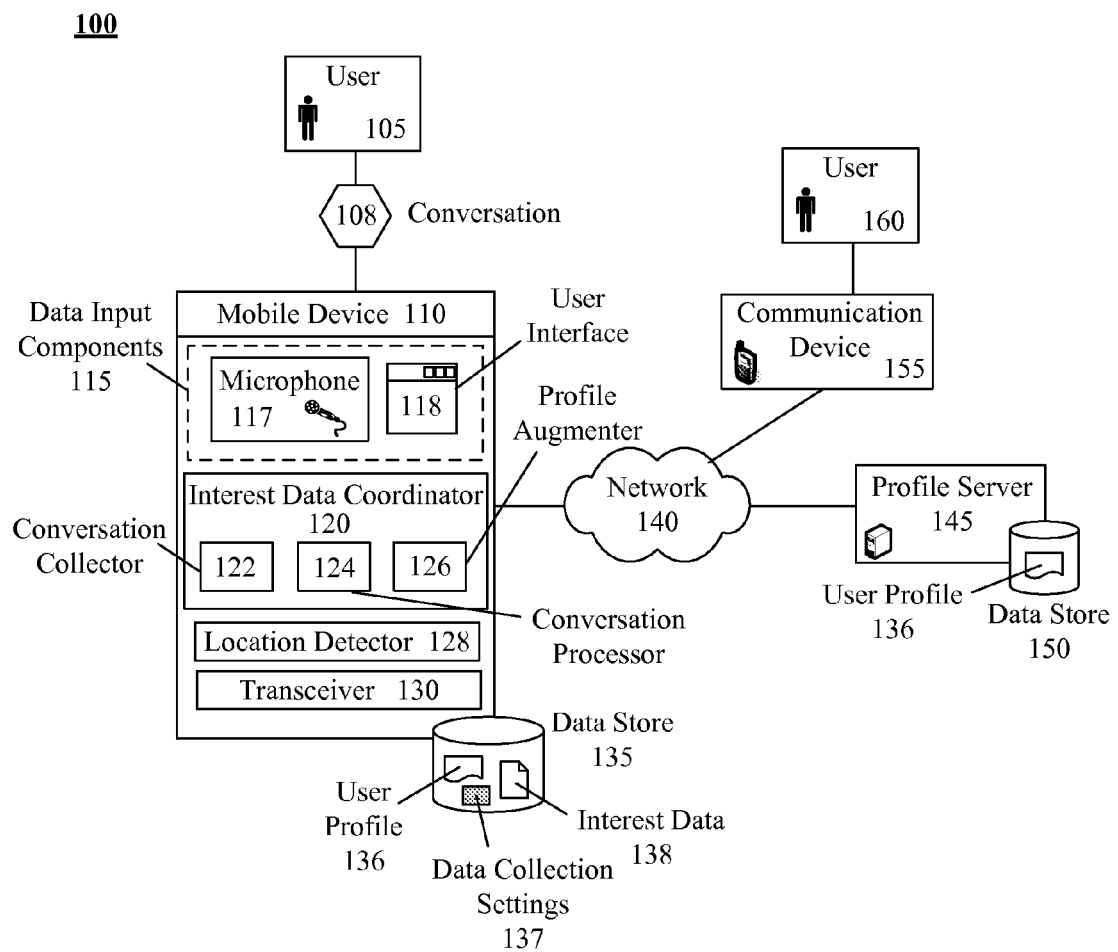
FIG. 1 is a schematic diagram illustrating a system that collects interest data from conversations on a mobile device to augment a user profile in accordance with embodiments of the inventive arrangements disclosed herein.

The present invention discloses a solution that collects interest data from conversations conducted on a mobile device and uses the collected interest data to automatically update a user profile. A conversation can be captured by data input components contained by the mobile device. Analysis of the conversation can be performed by an interest data coordinator. A group of collection settings can allow the user to configure parameters affecting the collection of interest data. Interest data extracted from the conversation can then be used to augment the user profile. The updated user profile can be transmitted to a profile server for use by additional applications and services for customizations.

The present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. Examples of a computer-readable medium include a semiconductor or solid state memory, magnetic tape, a removable computer diskette, a random access memory (RAM), a read-only memory (ROM), an erasable programmable read-only memory (EPROM or Flash memory, a rigid magnetic disk and an optical disk. Current examples of optical disks include compact disk-read only memory (CD-ROM), compact disk-read/write (CD-R/W) and DVD. Other computer-readable medium can include a transmission media, such as those supporting the Internet, an intranet, a personal area network (PAN), or a magnetic storage device. Transmission media can include an electrical connection having one or more wires, an optical fiber, an optical storage device, and a defined segment of the electromagnet spectrum through which digitally encoded content is wirelessly conveyed using a carrier wave.

Note that the computer-usable or computer-readable medium can even include paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a schematic diagram illustrating a system 100 that collects interest data 138 from conversations 108 on a mobile device 110 to augment a user profile 136 in accordance with embodiments of the inventive arrangements disclosed herein. In system 100, a user 105 can have a conversation 108 with another user 160 using a mobile device 110. The interest data coordinator 120 can extract interest data 138 from this conversation 108 to automatically augment the user profile 136 of the user 105.

As used herein, the term "conversation" is defined as a verbal or textual exchange of information between two or more parties. For example, conversation 108 can represent a telephone call and/or an exchange of text messages. Therefore, it is presumed that the mobile device 110 used by the user 105 is capable of supporting at least one of these conversational modes.

The mobile device 110 can represent a portable computing device capable of communicating the conversation 108 over a network 140. Examples of such a mobile device 110 can include, but is not limited to, a mobile phone, a laptop computer, a personal data assistant (PDA), a smart phone, a portable gaming system, and a portable media device.

The mobile device 110 can include a set of data input components 115, an interest coordinator 120, a location detector 128, a transceiver 130, and a data store 135. It should be noted that the mobile device 110 can include a variety of additional hardware and/or software components; only those components of particular relevance to the present invention are shown in system 100.

The set of data input components 115 can include hardware and/or software components used by the mobile device 110 to conduct a conversation 108. Examples of data input components 115 can include a microphone 117 to capture speech and a user interface 118 to capture text.

The interest data coordinator 120 can represent a software component that analyzes the conversation 108 for interest data 138, which can be used to augment the user profile 136. To perform these tasks, the interest data coordinator 120 can include a conversation collector 122, a conversation processor 124, and a profile augmenter 126.

The conversation collector 122 can be configured to collect a copy of the conversation 108 for analysis. Collection of the conversation 108 can involve monitoring the set of data input components 115 to determine the occurrence of the conversation 108. For example, the dialing of a phone feature can signal to the conversation collector 122 that the user 105 is attempting to initiate a conversation 108.

The conversation collector 122 can feed the copy of the conversation 108 directly to the conversation processor 124 in real-time. In an alternate embodiment, the conversation collector 122 can store an electronic copy (not shown) of the conversation 108 in the data store 135 for analysis by the conversation processor 124 at a later time.

The conversation processor 124 can represent an element of the interest data coordinator 120 that analyzes the conversation 108 for interest data 138. It should be noted that the type of analysis required depends upon the type of conversation 108 collected and/or supported by the mobile device 110. For example, a verbal conversation 108 would be analyzed utilizing a speech processing system, whereas a textual conversation 108 would use a text processing system.

As part of the analysis, the conversation processor 124 can utilize the location detector 128 of the mobile device 110. The location detector 128 can represent hardware and/or software components (e.g., a GPS component) that can determine the location of the mobile device 110. For example, the location of a mobile phone can be triangulated utilizing signals received from mobile telephony towers.

In another embodiment, the location detector 128 can be an integrated component of the interest data coordinator 120. For example, the location detector 128 can be a software application included with the interest data coordinator 120 that subscribes to a Web-based service that provides global positioning satellite (GPS) location information for a WIFI-enabled device, like a laptop computer.

The profile augmenter 126 can update the user profile 136 with the interest data 138 extracted by the conversation processor 124. The profile augmenter 126 can insert new entries into the user profile 138 as well as modify existing entries.

The functionality of the interest data coordinator 120 can be influenced by data collection settings 137. The data collection settings 137 can represent a variety of user-configurable parameters that can allow the user 105 to modify aspects of interest data 138 collection. For example, a user 105 can identify a set of contacts for which conversations 108 should not be analyzed.

The transceiver 130 can allow the transmission of the conversation 108 to the communication device 155 of the receiving user 160 and the user profile 138 to a profile server 145 over the network 140. The profile server 145 can represent a computing device configured to store user profiles 136 in an associated data store 150.

In another embodiment, the profile server 145 can include software applications (not shown) that can utilize the user profile 136 to provide customized data and/or services to the user 105. For example, the profile server 145 can include a recommendation engine (not shown) that provides item recommendations to the user 105 based on their user profile 136 (e.g., providing a listing of books about horses for a user 105 with horseback riding in their user profile 136).

It is important to highlight that the collection of interest data 138 and the modification of the user profile 136 occur without initiation by the user 105. That is, the operation of the interest data coordinator 120 can occur without interfering with the user's 105 use of the mobile device 110. Further, system 100 can increase the currency of data contained within the user profile 136 in comparison to the manual process in current use.

As used herein, presented data stores, including stores 135 and 150, can be a physical or virtual storage space configured to store digital information. Data stores 135 and 150 can be physically implemented within any type of hardware including, but not limited to, a magnetic disk, an optical disk, a semiconductor memory, a digitally encoded plastic memory, a holographic memory, or any other recording medium. Each of the data stores 135 and 150 can be a stand-alone storage unit as well as a storage unit formed from a plurality of physical devices. Additionally, information can be stored within data stores 135 and/or 150 in a variety of manners. For example, information can be stored within a database structure or can be stored within one or more files of a file storage system, where each file may or may not be indexed for information searching purposes. Further, data stores 135 and/or 150 can utilize one or more encryption mechanisms to protect stored information from unauthorized access.

Network 140 can include any hardware, software, and/or firmware necessary to convey data encoded within carrier waves. Data can be contained within analog or digital signals and conveyed through data or voice channels. Network 140 can include local components and data pathways necessary for communications to be exchanged among computing device components and between integrated device components and peripheral devices. Network 140 can also include network equipment, such as routers, data lines, hubs, and intermediary servers which together form a data network, such as the Internet. Network 140 can also include circuit-based communication components and mobile communication components, such as telephony switches, modems, cellular communication towers, and the like. Network 140 can include line based and/or wireless communication pathways.

Figure 2:
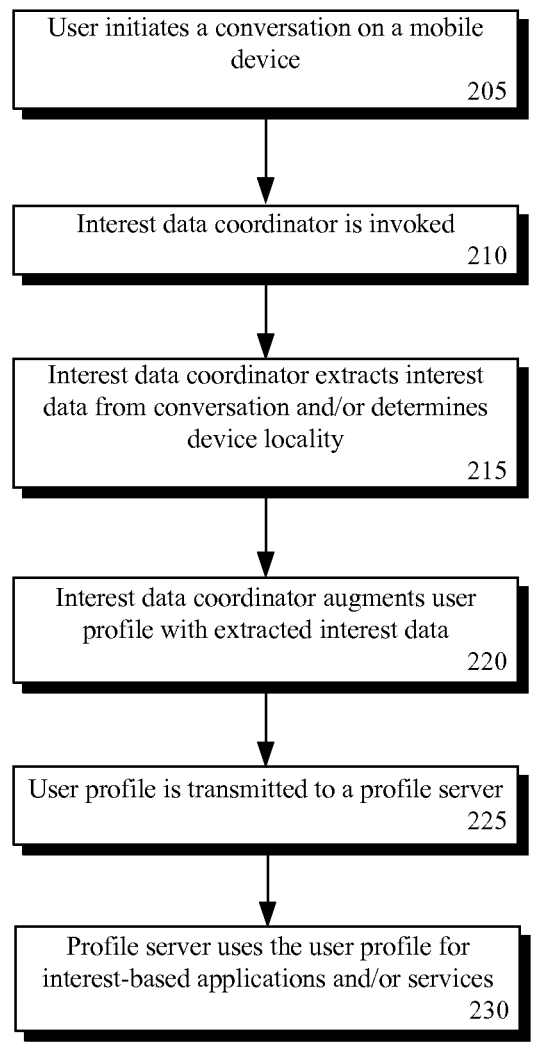
FIG. 2 is a flow chart of a method that collects interest data from conversations on a mobile device to augment a user profile in accordance with an embodiment of the inventive arrangements disclosed herein.

FIG. 2 is a flow chart of a method 200 that collects interest data from conversations on a mobile device to augment a user profile in accordance with an embodiment of the inventive arrangements disclosed herein. Method 200 can be performed in the context of system 100 or any other system supporting the collection of interest data from conversations on a mobile device to augment a user profile.

Method 200 can begin in step 205 where a user can initiate a conversation on a mobile device. In step 210, the interest data coordinator can be invoked. The interest data coordinator can extract interest data from the conversation and/or determine the device locality in step 215.

In step 220, the interest data coordinator can augment a user profile with the interest data extracted in step 215. The augment user profile can be transmitted to a profile server in step 225. In step 230, the profile server can utilize the user profile for interest-based applications and/or services.

Figure 3:
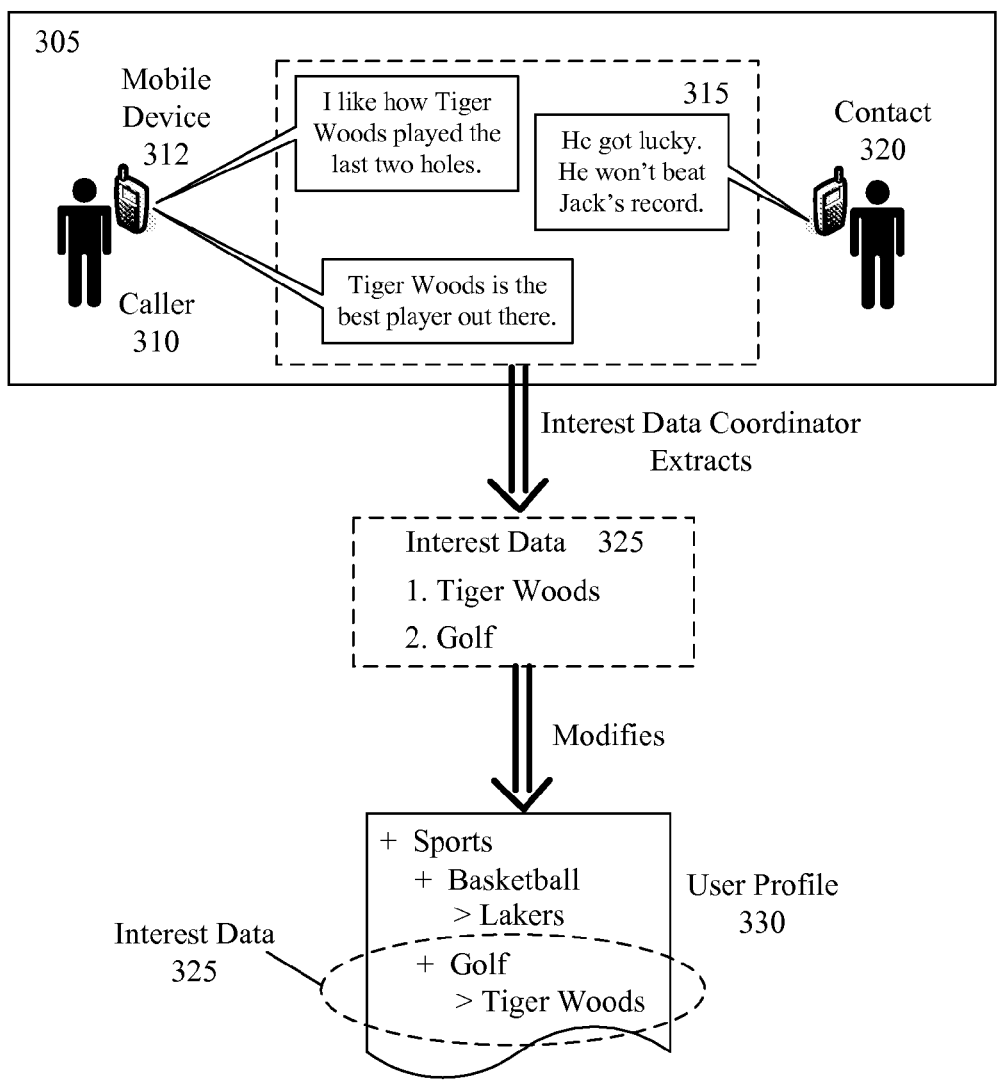
FIG. 3 is a collection of illustrative examples visually depicting the tasks performed by the interest data coordinator in accordance with an embodiment of the inventive arrangements disclosed herein.

FIG. 3 is a collection 300 of illustrative examples visually depicting the tasks performed by the interest data coordinator in accordance with an embodiment of the inventive arrangements disclosed herein. The illustrative examples of collection 300 can be conducted within the context of system 100 and/or the execution of method 200.

Collection 300 can begin with example situation 305. In example situation 305, a caller 310 is using a mobile device 312 to conduct a verbal conversation 315 with a contact 320. It should be noted that the caller 310 is so identified because the interest data coordinator analyzes the portion of the verbal conversation 315 from the conversation 315 initiator and not the contact 320 who is on the receiving end of the call.

As shown by the text in the speech bubbles, the caller 310 and the contact 320 can have a verbal exchange. From the contents of the verbal conversation 315 shown in the example situation 305, the interest data coordinator can extract two pieces of interest data 325—the caller 310 has an interest in Tiger Woods and in golf. These determinations can be made by the interest data coordinator due to the caller's 310 direct reference to Tiger Woods, which can be extrapolated to an general interest in golf, since Tiger Woods is a known golfer.

With the interest data 325 extracted, the interest data coordinator can then modify the user profile 330 accordingly. As shown by the circled section, the interest data 325 is now contained within the user profile 330. The interest data coordinator can include logic to ensure that data is represented properly within the structure of the user profile 330. As shown in collection 400, the user profile 330 contains a hierarchical structure in which the extracted interest data 325 should be placed under a heading for "Sports".

The diagrams in FIGS. 1-3 illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system for collecting interest data from conversations on a mobile device to augment a user profile comprising:
   an interest data coordinator configured to analyze a conversation conducted upon a mobile device for interest data;
   a group of data collection settings configured to control at least one user configurable parameter of the interest data coordinator, wherein the at least one user configurable parameter comprises a data collection frequency, a contact rating, and a location restriction; and
   a user profile configured to store a compilation of user data and interest data,
   wherein said interest data coordinator comprises a profile augmenter configured to automatically update the user profile.

2. The system of claim 1, wherein the conversation is a verbal or textual exchange of information between two or more parties, wherein the update of the user profile as performed by the interest data coordinator adds interest data from the conversation to the user profile that was not in the user profile before the automatic update action occurs.

3. The system of claim 2, wherein the at least one data input component comprises a microphone and a user interface.

4. The system of claim 2, wherein an extraction of interest data by the conversation processor comprises an invocation of a location detector, wherein the location detector determines a locality of the mobile device.

5. The system of claim 2, wherein the conversation processor is configured to utilize at least one of a speech processing system and a text processing system.

6. The system of claim 1, further comprising:
   a profile server configured to communicate with the mobile device, wherein a communication comprises a transmission of the user profile.

7. The system of claim 1, wherein the mobile device is at least one of a mobile phone, a laptop computer, a personal data assistant (PDA), a smart phone, a portable gaming system, and a portable media device.

8. A method for collecting interest data from conversations on a mobile device to augment a user profile comprising:
   identifying an initiation of a conversation on a mobile device;
   analyzing the conversation for interest data; and
   automatically augmenting a user profile with the collected interest data;
   wherein the extracting step is influenced by a group of data collection settings, wherein the group of collection settings controls at least one user configurable parameter of the interest data coordinator, wherein the at least one user configurable parameter comprises a data collection frequency, a contact rating, and a location restriction.

9. The method of claim 8, wherein the analyzing step further comprises:
   invoking an interest data coordinator in response to the identifying step;
   capturing the conversation;
   extracting interest data from the conversation; and
   placing this interest data from the conversation that did not previously exist within the user profile, as data elements of the user profile, wherein the conversation is a verbal or textual exchange of information between two or more parties.

10. The method of claim 8, wherein further comprising:
    transmitting the interest data to a remotely located profile server, which manages said user profile.

11. The method of claim 8, wherein the mobile device is at least one of a mobile phone, a laptop computer, a personal data assistant (PDA), a smart phone, a portable gaming system, and a portable media device, and wherein said user profile is a user profile of a social networking system.

12. The method of claim 8, wherein the analyzing step further comprises:
   determining a location of the mobile device; and
   optionally, ascertaining a place name associated with said location.

13. The method of claim 8, wherein said steps of claim 10 are steps performed by at least one machine in accordance with at least one computer program having a plurality of code sections that are executable by the at least one machine.

14. A mobile device that extracts interest data from conversations to augment a user profile comprising:
   at least one data input component configured to acquire a conversation conducted on a mobile device;
   an interest data coordinator configured to extract interest data from semantic content of the conversation, wherein the interest data coordinator utilizes the interest data to automatically augment a user profile, wherein the conversation is a verbal or textual exchange of information between two or more parties, and wherein the interest data is not present in the user profile until the user profile is automatically augmented by the interest data coordinator; and
   a group of data collection settings, wherein the group of collection settings controls at least one user configurable parameter used by the interest data coordinator, wherein the at least one user configurable parameter comprises a data collection frequency, a contact rating, and a location restriction, and wherein said user profile is a profile of a social networking system.

\* \* \* \* \*